United States Patent [19]
Schenk et al.

[11] 3,805,870
[45] Apr. 23, 1974

[54] MANUFACTURE OF HIGHLY CONCENTRATED SODIUM VINYL SULFONATE SOLUTIONS OR DRY SODIUM VINYL SULFONATE

[75] Inventors: Walter Schenk, Bad Duerkheim; Dieter Stockburger, Gruenstadt, both of Germany

[73] Assignee: Badische Anilin & Soda-Fabrik Aktiengesellschaft, Ludwigshafen, Germany

[22] Filed: Apr. 12, 1972

[21] Appl. No.: 243,229

[30] Foreign Application Priority Data
Apr. 15, 1972 Germany.......................... 2118248

[52] U.S. Cl. ............ 159/47 R, 159/45 L, 159/D10, 159/48 R, 159/48 L, 159/4 R
[51] Int. Cl. ....... B01d 1/16, B01d 1/00, F26b 7/100

[58] Field of Search ...... 159/48 R, 48 L, D10, D14, 159/47; 260/513 R, 456; 252/371

[56] References Cited
UNITED STATES PATENTS

| | | | |
|---|---|---|---|
| 2,316,670 | 4/1943 | Colgate et al. | 260/513 R |
| 2,594,875 | 4/1952 | Condit | 159/48 R X |
| 2,606,156 | 8/1952 | Davis | 252/161 |
| 2,667,469 | 1/1954 | Sauer | 260/456 R X |
| 3,127,442 | 3/1964 | Schenck et al. | 260/513 R |
| 3,415,870 | 12/1968 | Kangas et al. | 260/513 R X |

*Primary Examiner*—Jack Sofer
*Attorney, Agent, or Firm*—Johnston, Keil, Thompson & Shurtleff

[57] ABSTRACT

Process for the manufacture of highly concentrated sodium vinyl sulfonate solutions or dry sodium vinyl sulfonate by evaporation of water therefrom.

9 Claims, 1 Drawing Figure

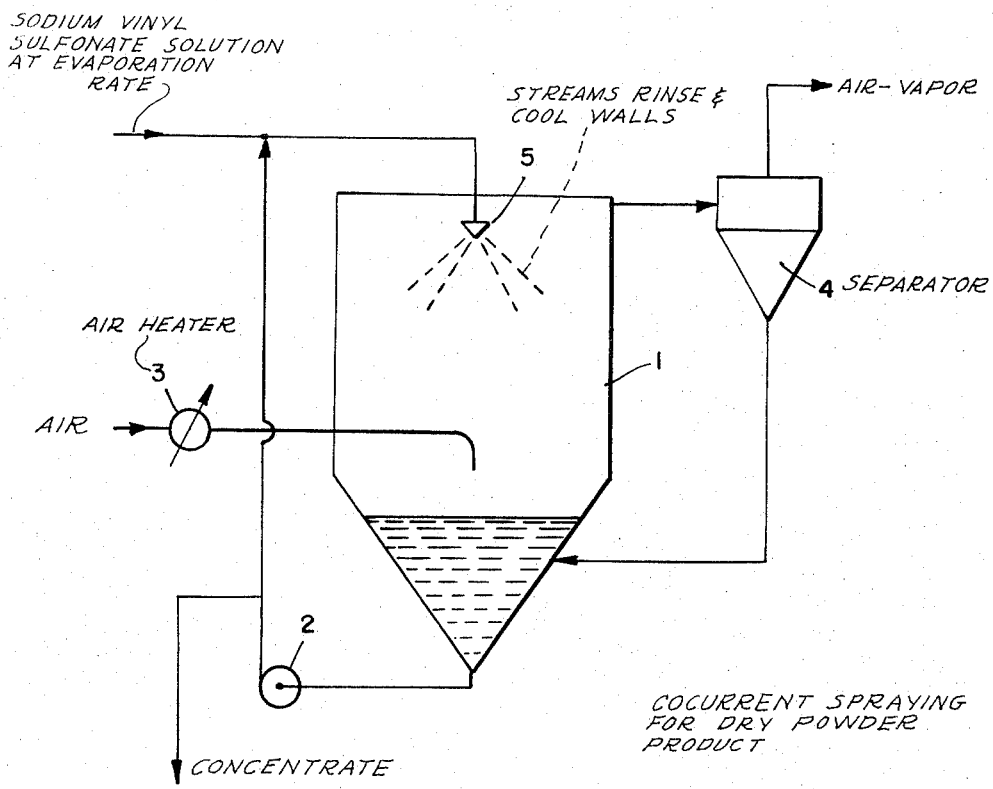

MANUFACTURE OF HIGHLY CONCENTRATED SODIUM VINYL SULFONATE SOLUTIONS OR DRY SODIUM VINYL SULFONATE

The salts of vinyl sulfonic acid are valuable starting materials for copolymerization with other comonomers such as methacrylates, acrylates, acrylonitrile, etc. They are also used as stabilizers for plastics dispersions.

Of particular commercial significance is the use of vinyl sulfonates as brighteners in bright nickel plating baths and in the galvanization of plastics.

Vinyl sulfonate solutions tend to polymerize, and they form polymers even when allowed to stand at room temperature, this being manifested by a rise in the viscosity of aqueous solutions thereof, in a reduction of their water solubility and in a drop in their hydrogenation iodine number. To achieve a certain degree of stability, polymerization inhibitors or stabilizers may be added to the vinyl sulfonate solutions, but this may give considerable trouble and have undesirable results in reactions involving, for example, nickel deposition during galvanization, or in polymerization processes.

Another drawback is the ease with which water is added on to the double bond to form inactive isethionates, this reaction being catalyzed by bases. It is consequently necessary to operate with very dilute aqueous solutions which should not, in general, contain more than 25 percent of vinyl sulfonate.

When subjected to normal treatment in stirred vessels, vinyl sulfonate is, for the above reasons, not resistant to aqueous alkalis at temperatures above 40° C, whereas polymerization occurs immediately under acid conditions, even at lower temperatures.

Thus the large-scale concentration of aqueous vinyl sulfonate solutions or the preparation of dry vinyl sulfonate involves considerable difficulty and the economics of using vinyl sulfonates is considerably impaired as a result of the high degree of dilution required and the short-term stability of the solutions.

Neither has it been possible, on a large scale, to carry out evaporation under vacuum or contact drying, which may take place at low temperatures, because the temperatures of the heating jacket may reach local values which are sufficiently high to impair the product in the manner described above. Moreover, heating surfaces show a strong tendency to incrustation, because the vinyl sulfonate is generally deposited thereon and is then chemically changed in the above-described manner.

It is an object of the invention to provide a way of manufacturing stable, non-impaired sodium vinyl sulfonate powder or highly concentrated solutions thereof at atmospheric pressure on an industrial scale.

We have now surprisingly found that dry sodium sulfonate or highly concentrated aqueous solutions thereof may be produced by evaporating the water at atmospheric pressure if said evaporation is carried out at liquid temperatures of between 40° and 70° C.

It is advantageous to carry out evaporation in moving stream of hot gas and to maintain the temperature of the solution between 40° and 70° C throughout the process.

The unexpected feature of this method is that, contrary to general supposition, the vinyl sulfonate does not, surprisingly, immediately polymerize at temperatures above 40° C.

Specifically, the process is carried out as follows. For example, the vinyl sulfonate solution, which generally contains about 20 percent of vinyl sulfonate, may be exposed to a stream of hot air in, say, a spray tower to evaporate the water, the amount of solution being treated in the manner of the invention being a multiple (of from 10 to 100 times) of that amount of solution which gives the maximum possible amount of water which can be evaporated under the temperature conditions used. In this case the solution is circulated through the spray tower a number of times. In this way, the stream of hot air, which generally has a temperature of from 150° to 500° C and preferably from 300° to 350° C, is cooled to the adiabatic saturation temperature of the solution without the latter being heated to a temperature above that stipulated in the present invention. At the same time, the stream of hot gas entrains that amount of water vapor which corresponds to the vapor pressure at the adiabatic saturation point, with the result that the solution is successively concentrated or evaporated to dryness during repetitions of this process.

The measures of spraying and circulating the solution also cause the walls of the apparatus to be swilled with a larger amount of solvent, thus avoiding incrustation thereon and permanent impairment of the product.

Of particular commercial interest is the procedure for carrying out the process in a spray-type evaporator for concentration of the solution, as illustrated in the accompanying drawing. In this procedure, solution which has been evaporated to the desired concentration is circulated through spray-type evaporator 1 by means of circulating pump 2 at a rate which is a multiple (of from 10 to 100 times) of the rate of evaporation of the water, fresh solution being added to the circulated solution at a rate equal to the rate of evaporation of the water. The circulated solution is sprayed into the gas chamber through one or more nozzles 5. Hot air, which has been heated in air heater 3, flows through the spray-type evaporator countercurrently to the liquid. Due to direct contact between the hot gas and the droplets of solution there is an exchange of heat coupled with an exchange of matter, resulting in the hot air being cooled to the adiabatic saturation temperature with decrease in volume. The large excess of liquid ensures that no droplet dries out completely and it is therefore not possible for the droplets to be overheated with resulting thermal damage to the product. The stream of excess liquid also constantly rinses and cools the walls of the apparatus, which prevents the solution from drying out on said walls with ensuing overheating of the product. Entrained droplets of liquid are separated in separator 4 and recycled to the evaporator. The solution of the desired concentration is bled from the loop. The residence time of the concentrated solution in the evaporator may be varied within wide limits by adjusting the level of the liquid therein.

If it is desired to evaporate the solution to dryness, it is convenient to use a conventional spray dryer, in which case the drying gases and the product must pass through the apparatus cocurrently.

EXAMPLE 1

MANUFACTURE OF VINYL SULFONATE POWDER

In a spray dryer having a diameter of 3.2 m and a cylinder height of 8 m, 175 kg/hr of sodium vinyl sulfonate solution is sprayed into a stream of air flowing cocurrently to the solution at a rate of 2,000 m³/hr (STP). Spraying is effected with a single-component nozzle at a pressure of 27 atmospheres gauge. The temperature of the air on entering the dryer is 200° C and 103° C on leaving. The water content of the solution, with reference to the product solution, is 60 percent on entering the dryer and 5 percent on leaving. The temperature of the dry product is 50° C. Its particle size distribution is between 10 and 300 μ and its bulk density is 860 g/l.

ANALYSIS RESULTS

| | |
|---|---|
| Solids content of initial solution | 33.7% |
| Hydrogenation iodine number of initial solution | 58.4 |
| Na$_2$SO$_4$ content of initial solution | 1.3% |
| Solids content of spray-dried product | 95.0% |
| Hydrogenation iodine number of spray-dried product | 165.5 |
| Na$_2$SO$_4$ content of spray-dried product | 3.65% |

If, however, drying experiments are carried out with the same sodium vinyl sulfonate solution using an immersion-type spray dryer, a liquid-phase spray dryer or a twin-roll spray dryer, avoiding undue heating of the vinyl sulfonate before drying, final moisture contents of from 1 to 8 percent are obtained but the product is impaired in all experiments to such an extent that it is useless.

ANALYSIS RESULTS

| | |
|---|---|
| Solids content of dried product | 96.5% |
| Hydrogenation iodine number of dried product | 60.1 |
| Na$_2$SO$_4$ content of dried product | 3.72% |

EXAMPLE 2

MANUFACTURE OF CONCENTRATED VINYL SULFONATE SOLUTIONS 250 m³/hr (STP) of hot air having an inlet temperature of 280° C is fed into a spray tower having a diameter of 0.7 m and a total length of 1.5 m. This air is used for concentration 75 kg/hr of sodium vinyl sulfonate solution having an initial water content of 150 percent of the solids to a final solids content of 66 percent. In order to cool the air to saturation temperature and to rinse the walls of the apparatus, 2.1 m³/hr of concentrated vinyl sulfonate solution is circulated and sprayed through eccentric spray nozzles, to which fresh solution is continuously fed, whilst 50 kg/hr of concentrated solution is continuously withdrawn. The air and the liquid flow countercurrently. The temperature of the concentrated solution is 57° C. The desired concentrated product shows no impairment.

ANALYSIS RESULTS

| | |
|---|---|
| Solids content of initial solution | 35.5% |
| Hydrogenation iodine number of initial solution | 62.5 |
| Na$_2$SO$_4$ content of initial solution | 1.1% |
| Solids content of spray-evaporated product | 66.5% |
| Hydrogenation iodine number of spray-evaporated product | 116.5 |
| Na$_2$SO$_4$ content of spray-evaporated product | 2.07% |

We claim:

1. A process for the manufacture of dry sodium vinyl sulfonate or highly concentrated aqueous solutions thereof which comprises evaporating water from an aqueous solution of said sodium vinyl sulfonate at atmospheric pressure, said evaporation being carried out at temperatures of the solution between 40° and 70° C.

2. A process as claimed in claim 1, wherein evaporation is carried out in a moving stream of hot gas and the temperature of the solution is kept between 40° and 70° C throughout the process.

3. A process as claimed in claim 2, wherein evaporation is carried out in a spray-type evaporator.

4. A process as claimed in claim 2 wherein said moving stream of gas is directed countercurrently to a recirculated solution of the sodium vinyl sulfonate to produce a highly concentrated solution of the sulfonate.

5. A process as claimed in claim 2 wherein said moving stream of gas is directed cocurrently to a sprayed solution of the sodium vinyl sulfonate for evaporation to a dry powder product.

6. A process as claimed in claim 2, wherein the solution is repeatedly passed through the hot stream of gas at a rate which is a plurality greater than the maximum rate of water evaporation therein.

7. A process as claimed in claim 6 wherein said solution is passed through the hot gas stream in an amount of 10 to 100 times the rate of evaporation.

8. A process as claimed in claim 2 wherein said hot gas is air introduced for contact with said solution at a temperature of about 150° to 500° C.

9. A process as claimed in claim 8 wherein said introduced hot gas temperature is about 300° to 350° C.

* * * * *

UNITED STATES PATENT OFFICE
CERTIFICATE OF CORRECTION

Patent No. 3,805,870             Dated April 23, 1974

Inventor(s) Walter Schenk and Dieter Stockburger

It is certified that error appears in the above-identified patent and that said Letters Patent are hereby corrected as shown below:

First page, left-hand column, fourteenth line, "April 15, 1972" should read -- April 15, 1971 --.

First page, left-hand column, fourteenth line, "2118248" should read -- P 21 18 248.9 --.

Column 1, line 57, "sodium sulfonate" should read -- sodium vinyl sulfonate --.

Signed and sealed this 22nd day of October 1974.

(SEAL)
Attest:

McCOY M. GIBSON JR.
Attesting Officer

C. MARSHALL DANN
Commissioner of Patents